(12) United States Patent
Hu et al.

(10) Patent No.: US 11,960,331 B2
(45) Date of Patent: Apr. 16, 2024

(54) FOLDABLE APPARATUS AND ELECTRONIC DEVICE

(71) Applicant: GUANGDONG OPPO MOBILE TELECOMMUNICATIONS CORP., LTD., Guangdong (CN)

(72) Inventors: Tingyong Hu, Guangdong (CN); Zekuan Zheng, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 227 days.

(21) Appl. No.: 17/720,273

(22) Filed: Apr. 13, 2022

(65) Prior Publication Data
US 2022/0247843 A1 Aug. 4, 2022

Related U.S. Application Data

(63) Continuation of application No. PCT/CN2020/124039, filed on Oct. 27, 2020.

(30) Foreign Application Priority Data

Oct. 29, 2019 (CN) .......................... 201911038595.9

(51) Int. Cl.
*G06F 1/16* (2006.01)
*H04M 1/02* (2006.01)

(52) U.S. Cl.
CPC .......... *G06F 1/1681* (2013.01); *G06F 1/1652* (2013.01); *H04M 1/022* (2013.01);
(Continued)

(58) Field of Classification Search
CPC ............. H04M 1/0216; H04M 1/0235; H04M 1/0268; H04M 1/0283; H04M 1/022; G06F 1/1681; G06F 1/1616; G06F 1/1652
See application file for complete search history.

(56) References Cited

U.S. PATENT DOCUMENTS 9,348,450 B1 * 5/2016 Kim ..................... H04M 1/0268
10,469,635 B1 * 11/2019 Carlson ............... H04M 1/0277
(Continued)

FOREIGN PATENT DOCUMENTS

| CN | 105491193 A | 4/2016 |
|---|---|---|
| CN | 107165927 A | 9/2017 |

(Continued)

OTHER PUBLICATIONS

Extended European Search Report for EP Application 20882226.2 dated Oct. 26, 2022. (5 pages).
(Continued)

*Primary Examiner* — Nidhi Thaker
(74) *Attorney, Agent, or Firm* — Young Basile Hanlon & MacFarlane, P.C.

(57) ABSTRACT

A foldable apparatus and an electronic device are provided in the present disclosure. The foldable apparatus includes a rotating shaft base and two main bodies disposed at two opposite sides of the rotating shaft base. Each main body is provided with a decorative member rotatably connected with the rotating shaft base and a housing slidably connected with the decorative member. The decorative member is disposed at an outer side of the housing and covers an edge of the housing close to the rotating shaft base. When the two main bodies are unfolded relative to each other, two housing respectively retract relative to two decorative members and respectively rotate along with the two decorative members to be close to the rotating shaft base, and the two decorative members rotate relative to the rotating shaft base to a flush state where a gap is defined between the two decorative members.

19 Claims, 4 Drawing Sheets

(52) U.S. Cl.
CPC ....... *H04M 1/0235* (2013.01); *H04M 1/0268* (2013.01); *H04M 1/0216* (2013.01)

(56) References Cited

U.S. PATENT DOCUMENTS

| | | | | |
|---|---|---|---|---|
| 10,480,225 | B1* | 11/2019 | Hsu | ............................ E05D 3/12 |
| 2011/0063783 | A1* | 3/2011 | Shim | ...................... G06F 1/1615 |
| | | | | 361/679.01 |
| 2015/0241925 | A1* | 8/2015 | Seo | ........................ G06F 1/1652 |
| | | | | 361/679.27 |
| 2017/0192460 | A1* | 7/2017 | Watanabe | ......... G02F 1/133305 |
| 2018/0196468 | A1* | 7/2018 | Watamura | ............. G06F 1/1652 |
| 2019/0028579 | A1 | 1/2019 | Cho et al. | |

FOREIGN PATENT DOCUMENTS

| | | | |
|---|---|---|---|
| CN | 108282560 | A | 7/2018 |
| CN | 108683758 | A | 10/2018 |
| CN | 109451685 | A | 3/2019 |
| CN | 208656822 | U * | 3/2019 |
| CN | 208656822 | U | 3/2019 |
| CN | 109600469 | A | 4/2019 |
| CN | 109658826 | A | 4/2019 |
| CN | 208686793 | U | 4/2019 |
| CN | 209105229 | U | 7/2019 |
| CN | 209232313 | U | 8/2019 |
| CN | 209330168 | U | 8/2019 |
| WO | 2019024044 | A1 | 2/2019 |

OTHER PUBLICATIONS

Chinese Notice of registration formalities with English Translation for CN Application 201911038595.9 dated Jan. 10, 2022. (8 pages).
Chinese First Office Action with English Translation for CN Application 201911038595.9 dated Jun. 23, 2021. (20 bages).
International Search Report with English Translation for PCT Application PCT/CN2020/124039 dated Jan. 29, 2021. (11 pages).

* cited by examiner

FOLDABLE APPARATUS AND ELECTRONIC DEVICE

CROSS-REFERENCE TO RELATED APPLICATION(S)

This application is a continuation application of International Application No. PCT/CN2020/124039, filed on Oct. 27, 2020, which claims priority to Chinese Patent Application No. 201911038595.9, filed on Oct. 29, 2019, the entire disclosure of both of which are incorporated herein by reference.

TECHNICAL FIELD

This disclosure relates to the field of communication devices, and in particular to a foldable apparatus and an electronic device.

BACKGROUND

At present, in a foldable mobile phone, a display screen of a mobile phone is folded in half to realize miniaturization of the mobile phone, which is convenient for a user to carry the mobile phone. However, at present, after the foldable mobile phone is unfolded, two main bodies at two sides of a rotating shaft of the mobile phone will abut against each other, sometimes, the two main bodies are unable to be completely unfolded and also easy to be damaged.

SUMMARY

A foldable apparatus is provided in implementations of the present disclosure, where the foldable apparatus includes a rotating shaft base and two main bodies disposed at two opposite sides of the rotating shaft base. Each main body is provided with a decorative member rotatably connected with the rotating shaft base and a housing slidably connected with the decorative member, and the decorative member is disposed at an outer side of the housing and covers an edge of the housing close to the rotating shaft base. When the two main bodies are unfolded relative to each other, two housings respectively retract relative to two decorative members and respectively rotate along with the two decorative members to be close to the rotating shaft base, and the two decorative members rotate relative to the rotating shaft base to a flush state where a gap is defined between the two decorative members. When the two main bodies are folded relative to each other, the two housings are respectively unfolded relative to the two decorative members and respectively rotate along with the two decorative members to be away from the rotating shaft base, and the two decorative members rotate relative to the rotating shaft base to a stacked state and respectively cover gaps between the two housings and the rotating shaft base.

An electronic device is provided in implementations of the present disclosure, where the electronic device includes a foldable apparatus and a flexible display screen. The foldable apparatus includes a rotating shaft base and two main bodies disposed at two opposite sides of the rotating shaft base, where each main body is provided with a decorative member rotatably connected with the rotating shaft base and a housing slidably connected with the decorative member, and the decorative member is disposed at an outer side of the housing and covers an edge of the housing close to the rotating shaft base. When the two main bodies are unfolded relative to each other, two housings respectively retract relative to two decorative members and respectively rotate along with the two decorative members to be close to the rotating shaft base, and the two decorative members rotate relative to the rotating shaft base to a flush state where a gap is defined between the two decorative members. When the two main bodies are folded relative to each other, the two housings respectively extend relative to the two decorative members and respectively rotate along with the two decorative members to be away from the rotating shaft base, and the two decorative members rotate relative to the rotating shaft base to a stacked state and respectively cover gaps between the two housings and the rotating shaft base. The flexible display screen has two parts which are able to be folded or unfolded relative to each other and a bendable part connected between the two parts, and the two parts are respectively fixed to sides of the two housings away from the decorative members.

BRIEF DESCRIPTION OF DRAWINGS

In order to describe technical solutions of the disclosure more clearly, the following will give a brief introduction to the accompanying drawings used for describing the implementations. Apparently, the accompanying drawings hereinafter described are merely some implementations of the present disclosure. Based on these drawings, those of ordinary skill in the art can also obtain other drawings without creative effort.

DETAILED DESCRIPTION

Technical solutions of implementations of the present disclosure will be described clearly and completely, with reference to accompanying drawings in the implementations of the present disclosure.

Figure 1:
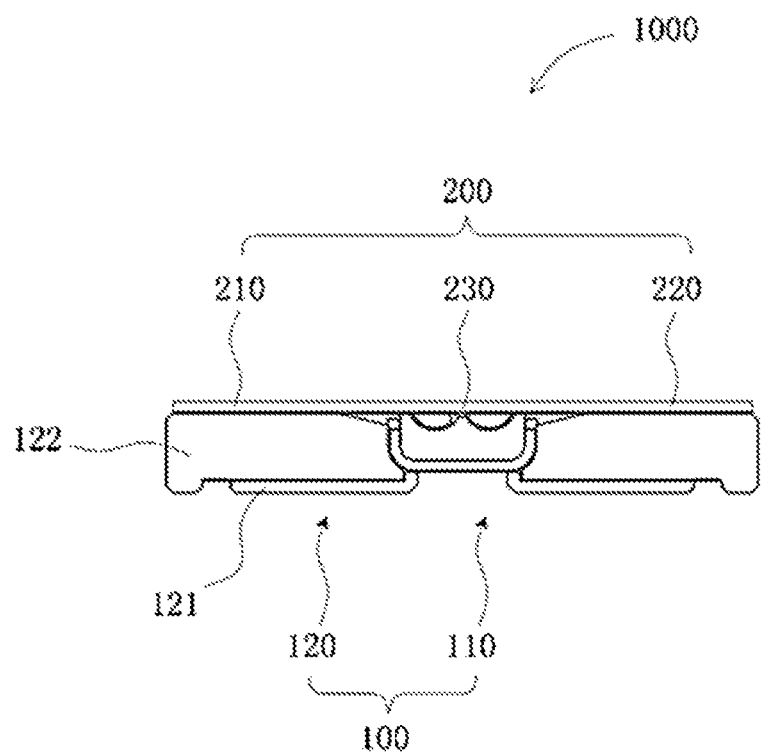
FIG. 1 is a schematic view illustrating an unfolded state of an electronic device provided in implementations of the present disclosure.
Figure 2:
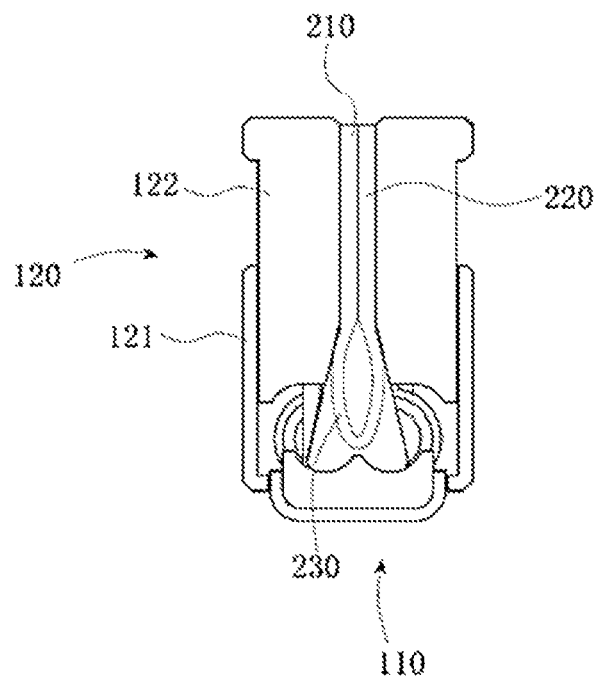
FIG. 2 is a schematic view illustrating a folded state of an electronic device provided in implementations of the present disclosure.
Figure 3:
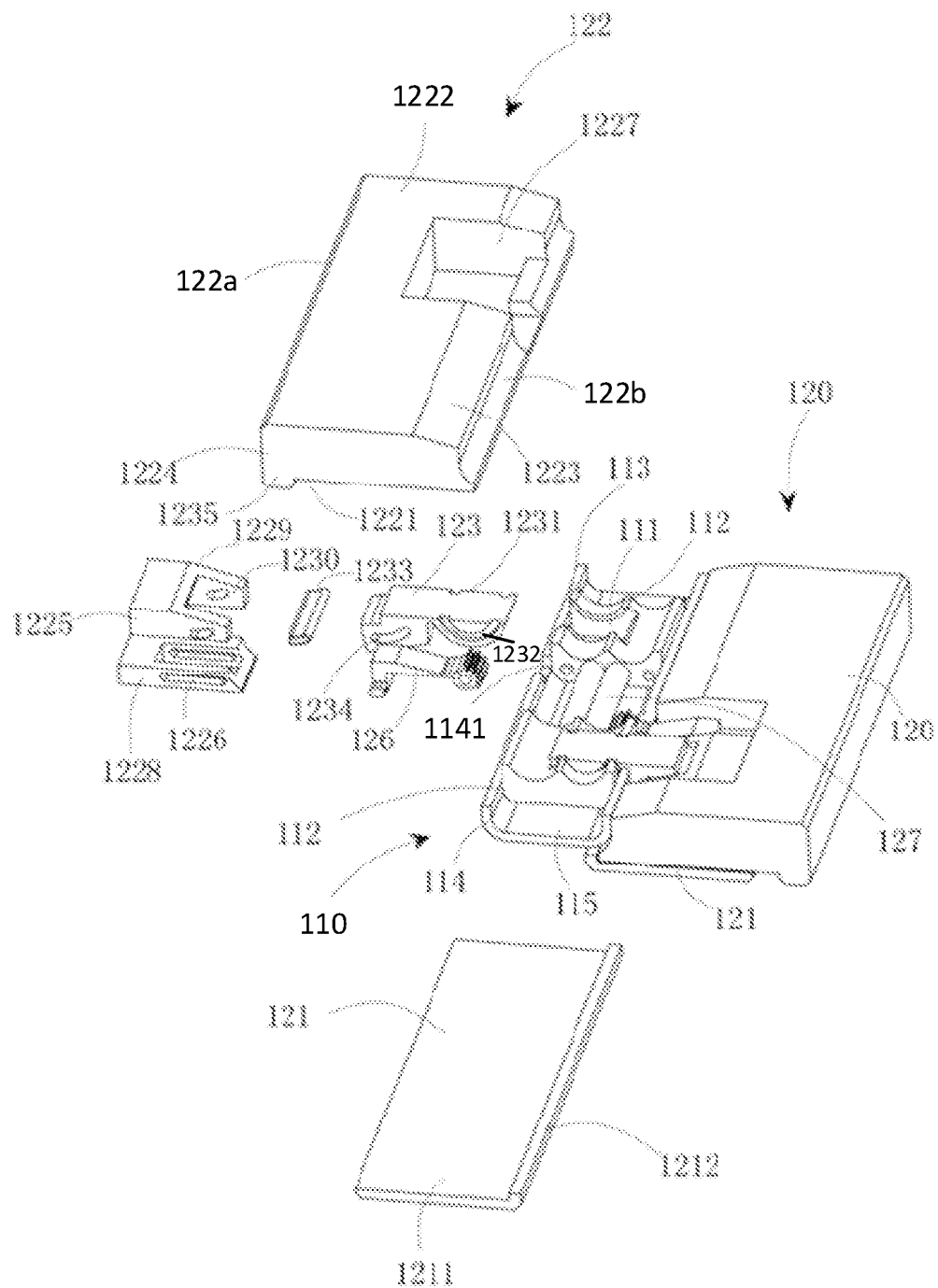
FIG. 3 is an exploded schematic view illustrating an unfolded state of a foldable apparatus of an electronic device provided in implementations of the present disclosure.

Reference can be made to FIG. 1, FIG. 2, and FIG. 3, and an electronic device 1000 is provided in the present disclosure. The electronic device 1000 includes a foldable apparatus 100 and a flexible display screen 200. The flexible display screen 200 has a first part 210, a second part 220 folded or unfolded relative to the first part 210, and a bendable part 230 connected between the first part 210 and the second part 220. The foldable apparatus 100 includes a rotating shaft base 110 and two main bodies 120 disposed at two opposite sides of the rotating shaft base 110. Each main body 120 is provided with a decorative member 121 rotatably connected with the rotating shaft base 110 and a housing 122 slidably connected with the decorative member 121. The decorative member 121 is disposed at an outer side of the housing 122 and covers an edge of the housing 122 close to the rotating shaft base 110.

When the two main bodies 120 are unfolded relative to each other, two housings 122 respectively retract relative to two decorative members 121 and respectively rotate along with the two decorative members 121 to be close to the rotating shaft base 110, and the two decorative members 121 rotate relative to the rotating shaft base 110 to a flush state where a gap is defined between the two decorative members 121.

When the two main bodies 120 are folded relative to each other, the two housings 122 respectively extend relative to the two decorative members 121 and respectively rotate along with the two decorative members 121 to be away from the rotating shaft base 110, and the two decorative members 121 rotate relative to the rotating shaft base 110 to a stacked state and respectively cover gaps between the two housings 122 and the rotating shaft base 110.

It can be understood that the two main bodies 120 can respectively carry the first part 210 and the second part 220, and the two main bodies 120 rotate relative to the rotating shaft base 110, to drive the first part 210 or/and the second part 220 to rotate relative to the rotating shaft base 110, such that the first part 210 and the second part 220 are folded or unfolded relative to each other, which enables the electronic device 1000 to present two usage states of being folded or being unfolded. The electronic device 1000 may be a mobile phone, a tablet computer, or a notebook computer, etc.

The main body 120 of the foldable apparatus 100 is provided with the decorative member 121 rotatably connected with the rotating shaft base 110 and the housing 122 slidably connected with the decorative member 121, and when the two main bodies 120 are unfolded relative to each other, the two housings 122 respectively retract relative to the two decorative members 121, and the two decorative members 121 rotate relative to the rotating shaft base 110 to the flush state where the gap is defined between the two decorative members 121, such that the two main bodies 120 will not abut against each other after the two main bodies 120 are unfolded, the two main bodies 120 can be unfolded completely, and a gap between the two main bodies 120 can be used to accommodate a foreign object, which will not cause damage to the main body 120 due to squeezing and will ensure safety.

In this implementation, the two housings 122 respectively support the first part 210 and the second part 220, such that the flexible display screen 200 is stable on the foldable apparatus 100. The decorative member 121 is disposed at a surface of the housing 122 away from the first part 210. The decorative member 121 can slide relative to the housing 122 substantially in a direction parallel to the first part 210. A sliding direction of the decorative member 121 relative to the housing 122 is substantially perpendicular to a length direction of the rotating shaft base 110. The decorative member 121 can retract relative to the housing 122, such that after the two housings 122 are unfolded, the gap is defined between the two decorative members 121, the gap can be used to accommodate the foreign object, the electronic device 1000 can be completely unfolded, and safety can be ensured. However, the decorative member 121 extends relative to the housing 122, such that after the two housings 122 are folded, the decorative member 121 can cover a gap between the housing 122 and the rotating shaft base 110 to ensure appearance performance of the electronic device 1000. The decorative member 121 extends relative to the housing 122, it can also be realized that the housing 122 is disposed away from the rotating shaft base 110, such that a space between the two housings 122 and the rotating shaft base 110 increases after the two housings 122 are folded, which facilitates that the space between the two housings 122 and the rotating shaft base 110 can be used to accommodate the bendable part 230 of the flexible display screen 200 bent in a shape of a water droplet.

Specifically, the housing 122 has a first edge 122a and a second edge 122b opposite to the first edge 122a, and the second edge 122b is adjacent to the rotating shaft base 110. The first edge 122a extends along a central axis parallel to the length direction of the rotating shaft base 110. The second edge 122b is parallel to the first edge 122a. The first edges 122a of the two housings 122 may be fixedly connected with an edge of the first part 210 and an edge of the second part 220 respectively. The first edges 122a of the two housings 122 may also be slidably connected with the edge of the first part 210 and the edge of the second part 220. The decorative member 121 covers the second edge 122b. The decorative member 121 can extend relative to the housing 122 from the second edge 122b. The decorative member 121 is substantially in a plate shape. The decorative member 121 is stacked with the housing 122 to ensure appearance performance of the housing 122. An inner side of the housing 122 can be used to accommodate a functional device of the electronic device 1000, which may be a battery, a circuit board, a connector, a memory, a processor, a camera, a fingerprint module, a speaker, an earpiece, etc.

More specifically, the housing 122 has a housing bottom-surface 1221, a housing top-surface 1222 parallel to the housing bottom-surface 1221, and a housing inclined-surface 1223 opposite to the housing bottom-surface 1221 and connected with and inclined relative to the housing top-surface 1222. The decorative member 121 can be in sliding fit with the housing bottom-surface 1221. The housing top-surface 1222 supports the flexible display screen 200. The housing inclined-surface 1223 is inclined toward the housing bottom-surface 1221. The housing inclined-surface 1223 is close to the rotating shaft base 110 relative to the housing top-surface 1222. When the two housings 122 are folded relative to each other, a triangular accommodating space is defined between two housing inclined-surfaces 1223, a space between the two housing inclined-surfaces 1223 is used to accommodate the bendable part 230 of the flexible display screen 200 bent in a shape of a water droplet, to prevent the housing 122 from squeezing and damaging the flexible display screen 200.

Furthermore, the main body 120 is further provided with a rotating member 123 rotatably connected with the rotating shaft base 110, and the housing 122 is rotatably connected with the rotating member 123. A rotation-axis direction of the decorative member 121 is parallel to a rotation-axis direction of the rotating member 123, and is parallel to a rotation-axis direction of the housing 122.

In this implementation, the rotating member 123 is rotatably connected with the second edge 122b of the housing 122. The rotating member 123 has a connecting end portion 1231 protruding relative to the second edge 122b, and the connecting end portion 1231 is rotatably connected with the rotating shaft base 110. A rotation-axis line of the rotating member 123 configured to rotate relative to the housing 122 is parallel to the second edge 122b. A rotation-axis line of the connecting end portion 1231 is parallel to the second edge 122b, such that the two main bodies 120 can be unfolded or folded relative to each other. The rotation-axis line of the rotating member 123 configured to rotate relative to the housing 122 is substantially coincident with a position where the housing inclined-surface 1223 is connected with the housing top-surface 1222, such that the rotating member 123 can rotate relative to the housing 122 to be flush with the housing inclined-surface 1223, which facilitates that the bendable part 230 of the flexible display screen 200 can be accommodated between the rotating members 123 of the two main bodies 120. The main body 120 can be provided with multiple rotating members 123 arranged at regular intervals in a length direction of the second edge 122b. The rotating members 123 of the two main bodies 120 may be rotatably connected with a same rotating shaft of the rotating shaft base 110, or rotatably connected with different rotating shafts of the rotating shaft base 110. On the rotating shaft base 110, the rotating members 123 of the two main bodies 120 may be symmetrically arranged along a central axis of the rotating shaft base 110 in a length direction, or arranged in alternation along the central axis of the rotating shaft base 110 in the length direction.

It can be understood that the housing 122 is rotatably connected with the rotating member 123, such that the housing top-surfaces 1222 of the housings 122 can be closer, so as to facilitate a closer fit of the first part 210 and the second part 220 of the flexible display screen 200 located between two housing top-surfaces 1222. The rotating member 123 drives the housing 122 to rotate relative to the rotating shaft base 110, and a distance between two folded housings 122 can be less than a distance between rotation-axis lines of two connecting end portions 1231.

Figure 4:
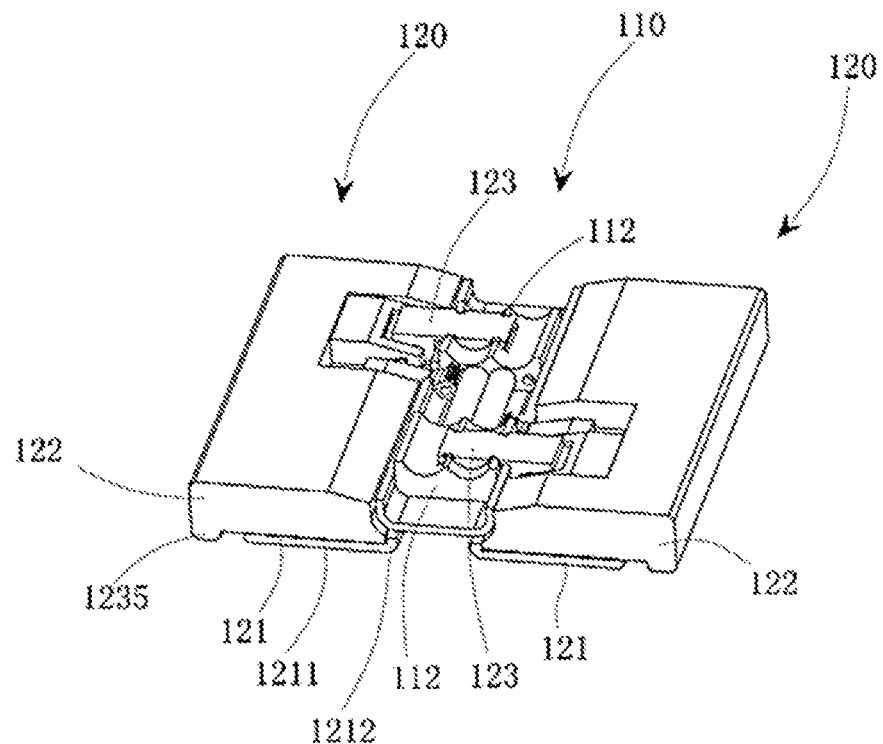
FIG. 4 is an assembled schematic view illustrating an unfolded state of a foldable apparatus of an electronic device provided in implementations of the present disclosure.

Furthermore, reference can be made to FIG. 3 and FIG. 4, the rotating shaft base 110 defines a rotating shaft groove 111, and the rotating member 123 is provided with a rotating wheel 1232 in rotating fit with the rotating shaft groove 111 at an end of the rotating member 123 away from the housing 122. When the two main bodies 120 are folded relative to each other, the rotating wheel 1232 partially rotates out of the rotating shaft groove 111, to make the housing 122 away from the rotating shaft base 110.

In this implementation, the rotating shaft base 110 is provided with a bearing assembly which includes at least two bearing blocks 112, and the rotating member 123 is rotatably connected with the bearing assembly. The bearing assembly has a bearing block 112, and the bearing block 112 defines the rotating shaft groove 111. The rotating shaft groove 111 is substantially a semicircular groove. A bottom surface of the rotating shaft groove 111 is a semicircular arc surface. The rotating wheel 1232 is disposed at the connecting end portion 1231. The rotating wheel 1232 is substantially a semicircular wheel. The rotating shaft groove 111 slidably guides the rotating wheel 1232 by the semicircular arc surface, such that the rotating wheel 1232 can rotate relative to the bearing block 112. When the rotating wheel 1232 is substantially accommodated in the rotating shaft groove 111, the rotating member 123 can be substantially flush with the bearing block 112, in other words, the two housings 122 are driven to be unfolded relative to each other, while a top of the bearing block 112 is flush with the rotating member 123, such that the bearing block 112 and rotating member 123 can exactly support the bendable part 230 of the flexible display screen 200 together. When the rotating wheel 1232 rotates relative to the bearing block 112 to be substantially staggered with the rotating shaft groove 111, the rotating member 123 can rotate to be inclined relative to the bearing block 112, in other words, ends of two rotating members 123 away from the rotating wheels 1232 can be closer, thereby driving the two housings 122 to be closer.

In this implementation, each bearing block 112 may be rotatably connected correspondingly with each rotating member 123. Multiple bearing blocks 112 may be arranged side by side on the rotating shaft base 110, and the multiple bearing blocks 112 are respectively rotatably connected with the multiple rotating members 123 which are arranged in alternation, such that a distance between rotation-axis lines of the rotating members 123 of the two main bodies 120 is less than a radius of the rotating wheel 1232, thereby reducing a volume of the rotating shaft base 110. Of course, in other implementations, each bearing block 112 may also be rotatably connected with two opposite rotating members 123.

Figure 5:
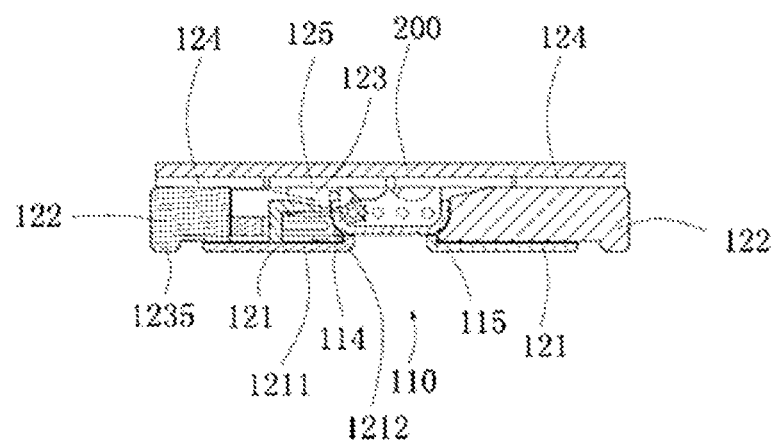
FIG. 5 is a schematic cross-sectional view illustrating an unfolded state of an electronic device provided in implementations of the present disclosure.
Figure 6:
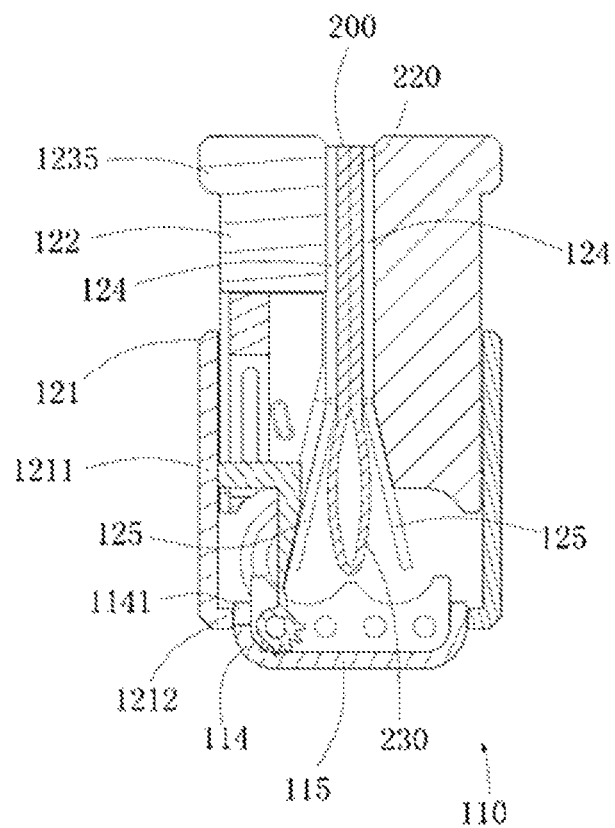
FIG. 6 is a schematic cross-sectional view illustrating a folded state of an electronic device provided in implementations of the present disclosure.

Furthermore, reference can be made to FIG. 5 and FIG. 6, the main body 120 is further provided with a first support plate 124 which is fixed to a side of the housing 122 away from the decorative member 121, and a second support plate 125 which is fixedly connected with the rotating member 123. When the two main bodies 120 are folded relative to each other, the two housings 122 respectively drive two first support plates 124 to be overlapped with each other, the second support plate 125 rotates relative to the housing 122 along with the rotating member 123 to be inclined relative to the first support plate 124, and an accommodating space is defined between two second support plates 125. When the two main bodies 120 are unfolded relative to each other, the two housings 122 respectively drive the two first support plates 124 to be flush with each other, and the second support plate 125 rotates relative to the housing 122 along with the rotating member 123 to be flush with the first support plate 124.

In this implementation, the first support plate 124 is fixed to the housing top-surface 1222 of the housing 122. The second support plate 125 is fixed to the rotating member 123. When the rotating member 123 rotates to be flush with the bearing block 112, the second support plate 125 is flush with the first support plate 124, and the main body 120 can effectively and stably support the first part 210 of the flexible display screen 200. When the ends of the two rotating members 123 away from the rotating wheels 1232 are close to each other, the second support plate 125 is inclined relative to the first support plate 124, and the second support plate 125 can be substantially attached to the housing inclined-surface 1223 of the housing 122, such that the accommodating space can be defined by yielding of the second support plates 125 to accommodate the bendable part 230 of a folded flexible display screen 200 by using the accommodating space. The first support plate 124 and the second support plate 125 can cover the housing 122 together. The first support plate 124 is adjacent to the first edge 122a of the housing 122, and the second support plate 125 is adjacent to the second edge 122b of the housing 122. When the two second support plates 125 are flush with each other, the two second support plates 125 are spliced with each other and can substantially cover the rotating shaft base 110, such that a middle bendable part 230 of the flexible display screen 200 in an unfolded state can be effectively stabilized at a position where the two second support plates 125 are spliced with each other.

Furthermore, reference can be made to FIG. 3, FIG. 5, and FIG. 6 together. Each main body 120 is further provided with a synchronous connecting member 126 penetrating through the housing 122 and fixedly connected with the decorative member 121, the synchronous connecting member 126 is rotatably connected with the rotating shaft base 110, a rotation axis of the synchronous connecting member 126 and a rotation axis of the rotating member 123 are staggered relative to each other, and the rotating shaft base 110 is provided with a synchronous transmission assembly 127 connected with two synchronous connecting members 126 to make the two main bodies 120 synchronously rotate relative to the rotating shaft base 110.

In this implementation, one end of the synchronous connecting member 126 is rotatably connected with the bearing block 112, the other end of the synchronous connecting member 126 penetrates through the housing 122 and is slidably connected with the housing 122. The end of the synchronous connecting member 126 penetrating through the housing 122 is further fixedly connected with the decorative member 121. The synchronous connecting member 126 drives the decorative member 121 to slide relative to the housing 122. The end of the synchronous connecting member 126 away from the decorative member 121 is rotatably connected with a side of the bearing block 112, such that the synchronous connecting member 126 and the rotating member 123 can be arranged side by side. Specifically, the synchronous connecting members 126 of the two main bodies 120 can be disposed between two adjacent bearing blocks 112. Two synchronous rotating shafts are further disposed between the two adjacent bearing blocks 112, and the synchronous transmission assembly 127 is provided with two synchronous transmission gears at the two synchronous rotating shafts. The two synchronous connecting members 126 have rotating gears at ends of the two synchronous connecting members 126 away from the housings 122, and the rotating gears can be used to engage with the two synchronous transmission gears, such that the two synchronous connecting members 126 synchronously rotate through the synchronous transmission assembly 127. Of course, in other implementations, the synchronous transmission assembly 127 may also be provided with a transmission wheel to be in rotating fit with the end of the synchronous connecting member 126 away from the decorative member 121, such that the two synchronous connecting members 126 are driven to synchronously rotate by damping force of rotation.

It can be understood that the synchronous connecting member 126 is slidably connected with the housing 122 and rotatably connected with the bearing block 112, and the synchronous connecting member 126 is fixedly connected with the decorative member 121, such that the decorative member 121 can rotate relative to the rotating shaft base 110 and can rotatably extend or retract relative to the housing 122. Through the synchronous connecting member 126, the decorative member 121 is rotatably connected with a rotating shaft indirectly and is slidably connected with the housing 122 indirectly, which simplify a structure of the main body 120.

Specifically, the housing 122 includes a back housing 1224 and a housing connecting member 1225 fixed to the back housing 1224, and the housing connecting member 1225 defines a sliding guide groove 1226. An end of the synchronous connecting member 126 away from the rotating shaft base 110 is in sliding fit with the sliding guide groove 1226, and penetrates through the sliding guide groove 1226 to be fixedly connected with the decorative member 121 to drive the decorative member 121 to slidably extend or retract relative to the back housing 1224. The housing 122 defines a fixed groove 1227 extending from the second edge 122b to the first edge 122a. The housing connecting member 1225 is fixed in the fixed groove 1227. The fixed groove 1227 penetrates through the housing inclined-surface 1223 and the housing bottom-surface 1221, to facilitate that the synchronous connecting member 126 penetrates through the housing 122.

The housing connecting member 1225 is provided with a sliding guide portion 1228 and a rotating guide portion 1229 arranged side by side with the sliding guide portion 1228. The sliding guide groove 1226 is defined in the sliding guide portion 1228. The sliding guide portion 1228 is configured to slidably guide the end of the synchronous connecting member 126 and limit the synchronous connecting member 126 to slide, so as to limit a rotation angle of the two main bodies 120. The sliding guide groove 1226 extends in a direction parallel to the housing bottom-surface 1221 and perpendicular to the length direction of the rotating shaft base 110. The rotating guide portion 1229 is rotatably connected with an end of the rotating member 123 away from the rotating wheel 1232. The rotating guide portion 1229 defines a rotating guide groove 1230. The end of the rotating member 123 is accommodated in the rotating guide groove 1230. The rotating guide groove 1230 is configured to guide the rotating member 123 to rotate through two inner walls which are perpendicular to the length direction of the rotating shaft base 110, so as to ensure that the rotation axis of the rotating member 123 is parallel to the length direction of the rotating shaft base 110.

More specifically, the housing connecting member 1225 is provided with a rotating limit pin 1233 at the rotating guide portion 1229. The rotating member 123 defines a curved sliding groove 1234, and the rotating limit pin 1233 is in sliding fit with the curved sliding groove 1234 to drive the housing 122 to rotate relative to rotating member 123. The rotating limit pin 1233 penetrates through two opposite inner walls of the rotating guide groove 1230. A circular arc center of the curved sliding groove 1234 is at a boundary between the first support plate 124 and the second support plate 125, and the rotating limit pin 1233 can be in sliding fit with the curved sliding groove 1234 to drive the rotating member 123 to rotate relative to the housing 122. The curved sliding groove 1234 extends along a circular arc curve. The rotating limit pin 1233 has two opposite curved mating surfaces, and the curved sliding groove 1234 has two curved guide surfaces in fit with the two curved mating surfaces respectively. The rotating limit pin 1233 is slidably disposed along the curved sliding groove 1234, such that the housing 122 and the first support plate 124 rotate relative to the rotating member 123 and the second support plate 125.

Furthermore, the rotating shaft base 110 is provided with a rotating shaft housing 113 and the bearing assembly fixed to the rotating shaft housing 113, the rotating member 123 and the synchronous connecting member 126 are both rotatably connected with the bearing assembly, and the decorative member 121 and the rotating shaft housing 113 are spliced to cover a gap between the back housing 1224 and the rotating shaft base 110.

In this implementation, the bearing block 112 is fixed to an inner side of the rotating shaft housing 113. The rotating shaft housing 113 is configured to protect the bearing block 112. The rotating shaft housing 113 has two side plates 114 closed to the two main bodies 120 respectively and a bottom plate 115 connected with the side plates 114. When the two main bodies 120 are unfolded relative to each other, the two decorative members 121 dock with the bottom plate 115 to respectively cover gaps between two back housings 1224 and the bottom plate 115. When the two main bodies 120 are folded relative to each other, the two decorative members 121 respectively dock with the two side plates 114 to respectively cover gaps between the two housings 122 and the two side plates 114. The side plates 114 are substantially perpendicular to the bottom plate 115. A circular arc chamfering is defined between a side plate 114 and the bottom plate 115. The side plate 114 defines a notch 1141 at an edge of the side plate 114 away from the bottom plate 115. When the two main bodies 120 are unfolded relative to each other, the synchronous connecting member 126 is partially located in the notch 1141, so as to ensure that the rotating member 123 can be substantially flush with bearing block 112 and ensure that the two housings 122 can be completely unfolded relatively to each other.

An edge of the decorative member 121 away from the first edge 122a can be adjacent to the rotating shaft housing 113, such that the decorative member 121 can cover the second edge 122b of the housing 122 in any situation, thereby ensuring appearance performance of the electronic device 1000. When the decorative member 121 retracts relative to the housing 122, the edge of the decorative member 121 away from the first edge 122a is substantially adjacent to the chamfering between the side plate 114 and the bottom plate 115, such that the decorative member 121 can also cover the side plate 114 of the rotating shaft base 110 and cover the rotating member 123 and the synchronous connecting member 126, which prevents dust and impurities from interfering with rotation of the rotating member 123 and the synchronous connecting member 126 and can ensure the appearance performance of the electronic device 1000 in an unfolded state. When the decorative member 121 extends relative to the housing 122, the edge of the decorative member 121 away from the first edge 122a of the housing 122 is substantially adjacent to the side plate 114 and the decorative member 121 at least covers the notch 1141 of the side plate 114, so as to prevent dust and impurities from entering the rotating shaft base 110 through the notch 1141.

Furthermore, the decorative member 121 has a decorative cover plate 1211 stacked with the back housing 1224 and a bending side plate 1212 connected with the decorative cover plate 1211. When the two main bodies 120 are unfolded relative to each other, the bending side plate 1212 abuts against an edge of the back housing 1224 close to the rotating shaft base 110, and the bending side plate 1212 docks with the bottom plate 115 at an edge of the bending side plate 1212 away from the decorative cover plate 1211.

In this implementation, the decorative cover plate 1211 is substantially attached to the housing bottom-surface 1221 of the housing 122. The decorative cover plate 1211 can slide relative to the housing 122 in a direction parallel to the housing bottom-surface 1221. The bending side plate 1212 is substantially perpendicular to the decorative cover plate 1211. When the two main bodies 120 are unfolded relative to each other, the decorative member 121 retracts relative to the housing 122 and the bending side plate 1212 abuts against an inner side surface of the housing 122 facing the rotating shaft base 110, so as to cover the second edge 122b of the housing 122 and make the gap between the two decorative members 121 substantially equal to a gap between the two housings 122, which presents the two decorative members 121 from clamping the foreign object, ensures safety, and enables the electronic device 1000 to be completely unfolded.

Furthermore, the back housing 1224 has an outer flange 1235 at an edge of the back housing 1224 away from the rotating shaft base 110. When the two main bodies 120 are unfolded relative to each other, an edge of the decorative cover plate 1211 away from the bending side plate 1212 is spaced apart from the outer flange 1235, and an end surface of the outer flange 1235 is flush with a surface of the decorative cover plate 1211 away from the back housing 1224.

In this implementation, the outer flange 1235 is disposed at the housing bottom-surface 1221, and the outer flange 1235 protrudes from the housing bottom-surface 1221 toward a direction away from the housing top-surface 1222. The outer flange 1235 can cover a gap between the decorative cover plate 1211 and the housing 122, so as to prevent dust and impurities from entering the gap between the housing 122 and the decorative cover plate 1211, which may hinder extension or retraction of the decorative cover plate 1211 relative to the housing 122. The end surface of the outer flange 1235 is flush with the surface of the decorative cover plate 1211 away from the housing 122, which ensures flatness of an external structure of the main body 120 and improves the appearance performance of the electronic device 1000.

The main body 120 of the foldable apparatus 100 is provided with the decorative member 121 rotatably connected with the rotating shaft base 110 and the housing 122 slidably connected with the decorative member 121, and when the two main bodies 120 are unfolded relative to each other, the two housings 122 respectively retract relative to the two decorative members 121, and the two decorative members 121 rotate relative to the rotating shaft base 110 to a flush state where the gap is defined between the two decorative members 121, such that the two main bodies 120 will not abut against each other after the two main bodies 120 are unfolded, the two main bodies 120 can be unfolded completely, the gap between the two main bodies 120 can be used to accommodate the foreign object without damaging the main body due to squeezing, and safety is ensured.

The above are the preferable implementations of the present disclosure. It should be noted that, for those of ordinary skill in the art, without departing from a concept of the present disclosure, several modifications and improvements can be made, and these modifications and improvements are also regard as the protection scope of the present disclosure.

What is claimed is:

1. A foldable apparatus, comprising: a rotating shaft base; and two main bodies disposed at two opposite sides of the rotating shaft base, wherein each main body is provided with a decorative member rotatably connected with the rotating shaft base and a housing slidably connected with the decorative member, and the decorative member is disposed at an outer side of the housing and covers an edge of the housing close to the rotating shaft base; when the two main bodies are unfolded relative to each other, two housings respectively retract relative to two decorative members and respectively rotate along with the two decorative members to be close to the rotating shaft base, and the two decorative members rotate relative to the rotating shaft base to a flush state where a gap is defined between the two decorative members; and when the two main bodies are folded relative to each other, the two housings respectively extend relative to the two decorative members and respectively rotate along with the two decorative members to be away from the rotating shaft base, and the two decorative members rotate relative to the rotating shaft base to a stacked state and respectively cover gaps between the two housings and the rotating shaft base, wherein the housing has a housing bottom-surface, a housing top-surface parallel to the housing bottom-surface, and a housing inclined-surface opposite to the housing bottom-surface and connected with and inclined relative to the housing top-surface, the decorative member is in sliding fit with the housing bottom-surface, the housing inclined-surface is inclined toward the housing bottom-surface, and the housing inclined-surface is close to the rotating shaft base relative to the housing top-surface; and when the two housings are folded relative to each other, a triangular accommodating space is defined between two housing inclined-surfaces.

2. The foldable apparatus of claim 1, wherein the main body is further provided with a rotating member rotatably connected with the rotating shaft base, and the housing is rotatably connected with the rotating member; and a rotation-axis direction of the decorative member is parallel to a rotation-axis direction of the rotating member, and is parallel to a rotation-axis direction of the housing.

3. The foldable apparatus of claim 2, wherein a rotation-axis line of the rotating member configured to rotate relative to the housing is coincident with a position where the housing inclined-surface is connected with the housing top-surface.

4. The foldable apparatus of claim 2, wherein the main body is provided with a plurality of rotating members arranged at regular intervals in a direction parallel to a length of the rotating shaft base.

5. The foldable apparatus of claim 2, wherein the rotating shaft base defines a rotating shaft groove, and the rotating member is provided with a rotating wheel in rotating fit with the rotating shaft groove at an end of the rotating member away from the housing; and
when the two main bodies are folded relative to each other, the rotating wheel partially rotates out of the rotating shaft groove, to make the housing away from the rotating shaft base.

6. The foldable apparatus of claim 5, wherein the rotating shaft base is provided with a bearing block, and the rotating shaft groove is defined in the bearing block;
when the rotating wheel rotates to be flush with the bearing block, the two housings are unfolded relative to each other; and
when the rotating wheel rotates to be inclined relative to the bearing block, the two housings are close to each other.

7. The foldable apparatus of claim 1, wherein the main body is further provided with a first support plate which is fixed to a side of the housing away from the decorative member, and a second support plate which is fixedly connected with the rotating member; when the two main bodies are folded relative to each other, the two housings respectively drive two first support plates to be overlapped with each other, the second support plate rotates relative to the housing along with the rotating member to be inclined relative to the first support plate, and an accommodating space is defined between two second support plates; and when the two main bodies are unfolded relative to each other, the two housings respectively drive the two first support plates to be flush with each other, and the second support plate rotates relative to the housing along with the rotating member to be flush with the first support plate.

8. The foldable apparatus of claim 7, wherein the first support plate and the second support plate cover the housing together, the first support plate is adjacent to one edge of the housing, and the second support plate is adjacent to the other edge of the housing.

9. The foldable apparatus of claim 7, wherein the two second support plates are spliced with each other and cover the rotating shaft base together, when the two second support plates are flush with each other.

10. The foldable apparatus of claim 7, wherein each main body is further provided with a synchronous connecting member penetrating through the housing and fixedly connected with the decorative member, the synchronous connecting member is rotatably connected with the rotating shaft base, a rotation axis of the synchronous connecting member and a rotation axis of the rotating member are staggered relative to each other, and the rotating shaft base is provided with a synchronous transmission assembly connected with two synchronous connecting members to make the two main bodies synchronously rotate relative to the rotating shaft base.

11. The foldable apparatus of claim 10, wherein an end of the synchronous connecting member penetrating through the housing is in sliding fit with the housing, and the end of the synchronous connecting member penetrating through the housing is further fixedly connected with the decorative member to drive the decorative member to slide relative to housing.

12. The foldable apparatus of claim 10, wherein the housing comprises a back housing and a housing connecting member fixed to the back housing, the housing connecting member defines a sliding guide groove, and an end of the synchronous connecting member away from the rotating shaft base is in sliding fit with the sliding guide groove and penetrates through the sliding guide groove to be fixedly connected with the decorative member to drive the decorative member to slidably extend or retract relative to the back housing.

13. The foldable apparatus of claim 12, wherein the housing connecting member is provided with a sliding guide portion, the sliding guide groove is defined in the sliding guide portion, and the sliding guide portion is configured to slidably guide the end of the synchronous connecting member and limit the synchronous connecting member to slide to limit a rotation angle of the two main bodies.

14. The foldable apparatus of claim 12, wherein the housing connecting member is further provided with a rotating limit pin, the rotating member defines a curved sliding groove, and the rotating limit pin is in sliding fit with the curved sliding groove to drive the housing to rotate relative to rotating member.

15. The foldable apparatus of claim 12, wherein the rotating shaft base is provided with a rotating shaft housing and a bearing assembly fixed to the rotating shaft housing, the rotating member and the synchronous connecting member are both rotatably connected with the bearing assembly, and the decorative member and the rotating shaft housing are spliced to cover a gap between the back housing and the rotating shaft base.

16. The foldable apparatus of claim 15, wherein the rotating shaft housing has two side plates respectively close to the two main bodies and a bottom plate connected with the side plates;
when the two main bodies are unfolded relative to each other, the two decorative members dock with the bottom plate to respectively cover gaps between two back housings and the bottom plate; and
when the two main bodies are folded relative to each other, the two decorative members respectively dock with the two side plates to respectively cover gaps between the two housings and the two side plates.

17. The foldable apparatus of claim 16, wherein the decorative member has a decorative cover plate stacked with the back housing and a bending side plate connected with the decorative cover plate; and
when the two main bodies are unfolded relative to each other, the bending side plate abuts against an edge of the back housing close to the rotating shaft base, and the bending side plate docks with the bottom plate at an edge of the bending side plate away from the decorative cover plate.

18. The foldable apparatus of claim 17, wherein the back housing has an outer flange at an edge of the back housing away from the rotating shaft base; and when the two main bodies are unfolded relative to each other, an edge of the decorative cover plate away from the bending side plate is spaced apart from the outer flange, and an end surface of the outer flange is flush with a surface of the decorative cover plate away from the back housing.

19. An electronic device, comprising: a foldable apparatus, comprising:

a rotating shaft base; and two main bodies disposed at two opposite sides of the rotating shaft base, wherein each main body is provided with a decorative member rotatably connected with the rotating shaft base and a housing slidably connected with the decorative member, and the decorative member is disposed at an outer side of the housing and covers an edge of the housing close to the rotating shaft base; when the two main bodies are unfolded relative to each other, two housings respectively retract relative to two decorative members and respectively rotate along with the two decorative members to be close to the rotating shaft base, and the two decorative members rotate relative to the rotating shaft base to a flush state where a gap is defined between the two decorative members; and when the two main bodies are folded relative to each other, the two housings respectively extend relative to the two decorative members and respectively rotate along with the two decorative members to be away from the rotating shaft base, and the two decorative members rotate relative to the rotating shaft base to a stacked state and respectively cover gaps between the two housings and the rotating shaft base; a flexible display screen, wherein the flexible display screen has two parts which are able to be folded or unfolded relative to each other and a bendable part connected between the two parts, and the two parts are respectively fixed to sides of the two housings away from the decorative members, wherein the housing has a housing bottom-surface, a housing top-surface parallel to the housing bottom-surface, and a housing inclined-surface opposite to the housing bottom-surface and connected with and inclined relative to the housing top-surface, the decorative member is in sliding fit with the housing bottom-surface, the housing inclined-surface is inclined toward the housing bottom-surface, and the housing inclined-surface is close to the rotating shaft base relative to the housing top-surface; and when the two housings are folded relative to each other, a triangular accommodating space is defined between two housing inclined-surfaces.

\* \* \* \* \*